(12) United States Patent
Tsuji et al.

(10) Patent No.: US 9,742,040 B2
(45) Date of Patent: Aug. 22, 2017

(54) SODIUM-SULFUR BATTERY

(71) Applicant: NGK Insulators, Ltd., Nagoya-Shi (JP)

(72) Inventors: Yuki Tsuji, Ichinomiya (JP); Kazuyuki Tahara, Nagoya (JP); Masahiro Murasato, Chita (JP); Takuya Ishihara, Tsushima (JP); Ichiro Okazaki, Nagoya (JP); Yasuhiro Horiba, Ichinomiya (JP); Miho Kasahara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 234 days.

(21) Appl. No.: 14/630,861

(22) Filed: Feb. 25, 2015

(65) Prior Publication Data
US 2015/0194706 A1    Jul. 9, 2015

Related U.S. Application Data

(63) Continuation of application No. PCT/JP2013/074384, filed on Sep. 10, 2013.

(30) Foreign Application Priority Data

Sep. 12, 2012 (JP) ................................. 2012-200335

(51) Int. Cl.
*H01M 10/39*    (2006.01)
*H01M 2/10*     (2006.01)
*H01M 10/658*   (2014.01)

(52) U.S. Cl.
CPC ..... *H01M 10/3909* (2013.01); *H01M 2/1077* (2013.01); *H01M 2/1088* (2013.01);
(Continued)

(58) Field of Classification Search
CPC ......... H01M 10/3909; H01M 10/3961; H01M 2200/00; H01M 2/1088; H01M 2/1077
(Continued)

(56) References Cited

U.S. PATENT DOCUMENTS

| 4,110,515 A | 8/1978 | Gupta |
| 4,117,209 A | 9/1978 | Markin et al. |

(Continued)

FOREIGN PATENT DOCUMENTS

| CN | 202395065 U | 8/2012 |
| JP | 07-014606 A1 | 1/1995 |

(Continued)

OTHER PUBLICATIONS

Chinese Office Action (Application No. 201380040404.7) dated Apr. 25, 2016.

(Continued)

*Primary Examiner* — Jayne Mershon
(74) *Attorney, Agent, or Firm* — Burr & Brown, PLLC

(57) ABSTRACT

A sodium-sulfur battery according to the present invention is provided with a reservoir space 100 that retains and solidifies a high-temperature molten material having flowed out of a cell 4, in order to prevent the high-temperature molten material from leaking out of a casing 1, even when an accident occurs to generate the high-temperature molten material inside the casing. The reservoir space 100 can be formed along a perimeter of the casing 1, or alternatively, can be formed inside the casing 1. The reservoir space 100 includes, for example, a composite member 15 of a rigid member 11, a heat-insulating material 12, and a heat-resisting material 13.

8 Claims, 4 Drawing Sheets

(52) U.S. Cl.
CPC ..... *H01M 2/1094* (2013.01); *H01M 10/3981* (2013.01); *H01M 10/658* (2015.04); *H01M 2200/00* (2013.01)

(58) Field of Classification Search
USPC .......................................................... 429/104
See application file for complete search history.

(56) References Cited

U.S. PATENT DOCUMENTS

| | | |
|---|---|---|
| 4,323,620 A | 4/1982 | Iwabuchi et al. |
| 4,895,776 A | 1/1990 | Virkar et al. |

FOREIGN PATENT DOCUMENTS

| | | |
|---|---|---|
| JP | 10-284119 A1 | 10/1998 |
| JP | 10-294128 A1 | 11/1998 |
| JP | 2937789 B2 | 8/1999 |
| JP | 3253888 B2 | 2/2002 |
| JP | 3177968 U | 8/2012 |
| JP | 3177969 U | 8/2012 |

OTHER PUBLICATIONS

International Search Report (Application No. PCT/JP2013/074384) dated Nov. 12, 2013 (in English).
Extended European Search Report (Application No. 13836927.7) dated Mar. 4, 2016.

SODIUM-SULFUR BATTERY

TECHNICAL FIELD

The present invention relates to a sodium-sulfur battery capable of preventing fire from spreading to an adjacent module, even when a high-temperature molten material is generated in a module at the time of an accident.

BACKGROUND ART

A power storage system using a sodium-sulfur battery includes the required number of module batteries that are combined depending on the storage capacity. Each module has a large number such as hundreds of cells contained inside a heat-insulating container. The module batteries are housed in multiple vertical tiers within a rack, and are installed as a sodium-sulfur battery package.

A sodium-sulfur battery module is a cell assembly contained inside a housing that is a heat-insulating module container. The cell has a structure in which molten metallic sodium serving as a negative-electrode active material is located in one part and molten sulfur serving as a positive-electrode active material is located in another part, and in which the both active materials are separated by a β-alumina solid electrolyte selectively permeable to sodium ions. The cell is heat controlled for each module at 300 to 350° C. Since the cell is a high-temperature cell which operates in such high temperature conditions, various safety measures have been taken.

However, there remains a possibility that the cell be broken to cause a high-temperature molten material to flow into the inside of the heat-insulating container and cross an inter-block sand layer to reach an adjacent block of the cells which short-circuit, and a large number of the cells be broken by heat generated by short-circuit current to cause fire to spread to the entire module. Moreover, there remains a possibility that, once a fire occurs, the fire be not confined to the inside of the casing which is hermetically sealed, and fire spread to horizontally and vertically adjacent modules within the package to cause the extensive fire.

Thus, as described in Patent Literature 1, it has been proposed to place a heat-resisting plate such as carbon cloth in the upper inside of a casing which included in a module, in order to prevent a flame from going outside at the time of fire. However, since the heat-resisting plate has a low strength, the heat-resisting plate easily deforms by pressure of a high-temperature molten material generated at the time of fire. As a result, there has remained a possibility that a top lid be broken by such pressure to cause the high-temperature molten material to spout and fire spread to an upper module. Furthermore, there has remained a possibility that the high-temperature molten material melt and penetrate the top lid by heat thereof to spout together with a combustion flame.

CITATION LIST

Patent Literature

Patent Literature 1: JP 3253888 B1

SUMMARY OF INVENTION

Technical Problem

Therefore, it is an objective of the present invention to solve the above described problems and to provide a highly safe sodium-sulfur battery capable of preventing fire from spreading to an adjacent module owing to a high-temperature molten material even when an accident occurs due to some cause to generate the high-temperature molten material inside a casing which is a module container.

Solution to Problem

To solve the above problems, a sodium-sulfur battery according to an aspect of the present invention is a sodium-sulfur battery having a plurality of cells contained in a casing provided with a top lid and including a heat-insulating layer, wherein a reservoir space is formed to retain and solidify a high-temperature molten material having flowed out of the cells.

According to a second aspect of the invention, the reservoir space is formed by a reservoir container including a composite member of a rigid member, a heat-insulating material, and a heat-resisting material, the reservoir container is laid between the casing and a casing pallet which supports the casing, and the reservoir container has a side wall standing with a gap between the side wall and an outer wall surface of the casing.

According to a third aspect of the invention, the reservoir space is formed by the composite member of the rigid member, the heat-insulating material, and the heat-resisting material that is laid between the casing and the casing pallet which supports the casing, and a steel member standing with a gap between the steel member and the outer wall surface of the casing.

According to a fourth aspect of the invention, the reservoir space is formed by a reservoir container including a composite member of the heat-insulating material and the heat-resisting material, and the reservoir space is located in a space containing the cells within the casing.

According to a fifth aspect of the invention, the reservoir space is formed by a reservoir container including the composite member of the heat-insulating material and the heat-resisting material, and the reservoir space is located within the heat-insulating layer included in the casing.

Note that, according to a sixth aspect of the invention, the heat-insulating material preferably includes a ceramic fiber blanket or a mica material, and the heat-resisting material preferably includes a carbon material.

According to a seventh aspect of the invention, a heat-resisting guide is disposed in a gap between a casing body and the top lid on an inner surface of the top lid of the casing.

According to an eighth aspect of the invention, the heat-resisting guide can include a heat-insulating material and a fire-resisting material, and, according to a ninth aspect of the invention, the heat-resisting guide can include a mica plate and a carbon material.

Advantageous Effect of Invention

In the sodium-sulfur battery according to the present invention, the reservoir space is formed to retain and solidify the high-temperature molten material having flowed out of the cells. Therefore, even when the high-temperature molten material is generated at the time of fire, the high-temperature molten material is retained inside the reservoir space. Although the high-temperature molten material may reach a temperature of more than 2000° C., the material solidifies while retained within the reservoir space, without leaking out of the reservoir space. Accordingly, the spread of fire to an adjacent module can reliably be prevented. Note that a position and a form of the reservoir space can adopt various aspects as described in the second aspect to the fifth aspect.

Furthermore, as described in the seventh aspect, when the heat-resisting guide is disposed in the gap between the casing body and the top lid on the inner surface of the top lid of the casing, the high-temperature molten material flows along the heat-resisting guide into the reservoir space via the side of the casing. Therefore, the high-temperature molten material does not penetrate the top lid to spout upward.

DESCRIPTION OF EMBODIMENT

Preferred embodiments of the present invention are described below.

Figure 1:
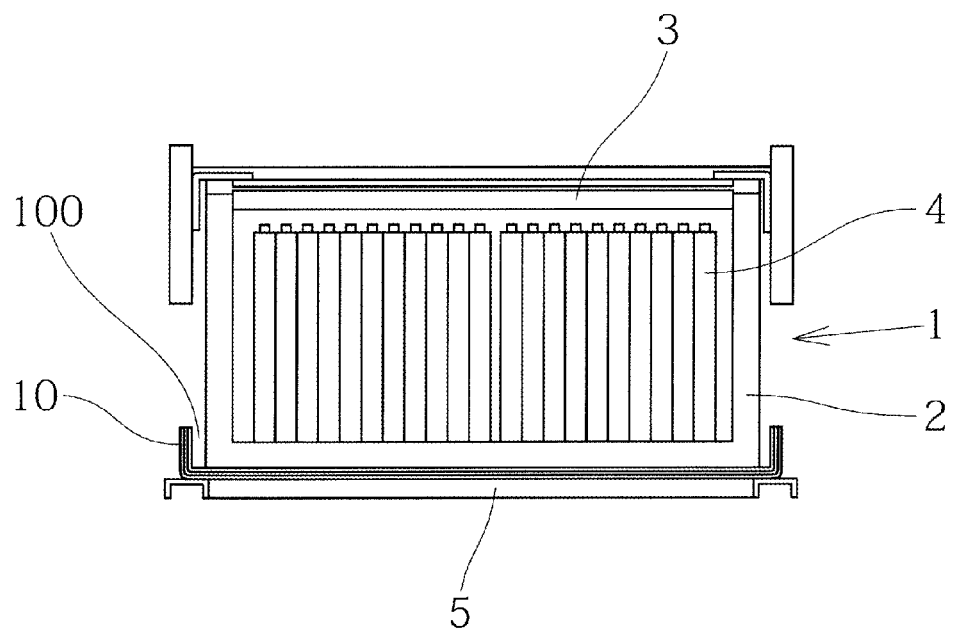
FIG. 1 is a cross-sectional view showing an entire configuration of a module battery.

FIG. 1 shows a heat-insulating casing (a module container) 1 including a casing body 2 and a top lid 3. A plurality of cells 4 is contained inside the casing. The casing body 2 and the top lid 3 each have a heat-insulating structure in which a heat-insulating layer is formed inside a stainless-steel outer covering. The casing 1 is supported on a casing pallet 5. The casing pallet 5 is a steel structure also called a slide base.

As described above, each cell 4 has a structure in which molten metallic sodium serving as a negative-electrode active material is located in one part, and molten sulfur serving as a positive-electrode active material is located in another part and in which the both active materials are separated by a beta-alumina solid electrolyte selectively permeable to sodium ions. Sodium ions pass through a wall surface of a beta-alumina tube serving as the solid electrolyte, whereby charging and discharging are performed.

When the beta-alumina tube in the cell 4 is broken due to some cause, molten metallic sodium serving as the negative-electrode active material and molten sulfur serving as the positive-electrode active material may react to generate a high-temperature molten material having a temperature that exceeds 2000° C. When such a high-temperature molten material spreads inside the casing 1, there is a possibility that the adjacent cell 4 be also affected and that, in the worst case, the high-temperature molten material flow out of the casing 1 together with a combustion flame to cause fire to spread to the upper or laterally adjacent casing 1. Thus, in the present invention, a reservoir space 100 is formed to retain and solidify the high-temperature molten material having flowed out of the cells 4. Specific configurations of the reservoir space 100 will be described below.

Figure 2:
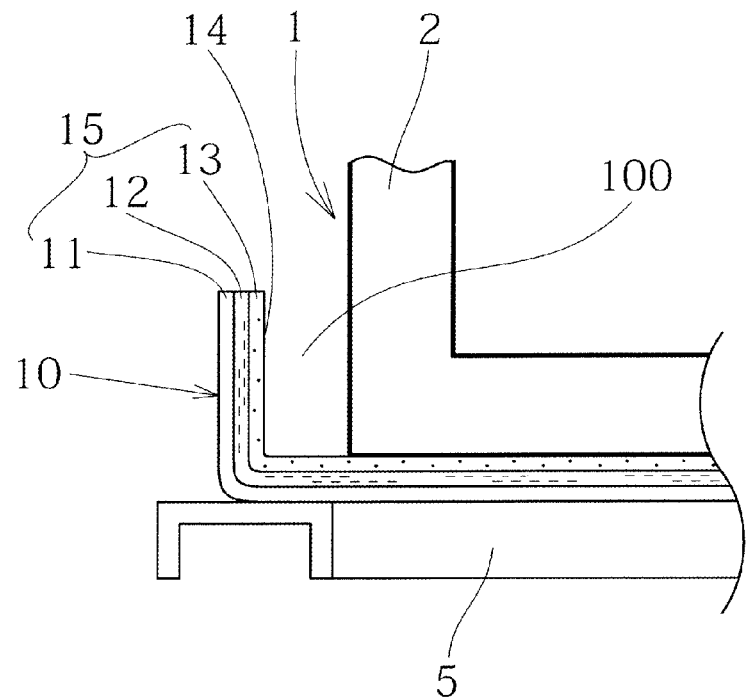
FIG. 2 is a cross-sectional view showing an embodiment according to the second aspect of the invention.

FIG. 2 is a cross-sectional view showing an embodiment according to the second aspect of the invention. A reservoir container 10 includes a composite member 15 of a rigid member 11, a heat-insulating material 12, and a heat-resisting material 13. The rigid member 11 is preferably a steel plate, and is a member for giving mechanical strength to the reservoir container 10. The heat-insulating material 12 is a ceramic fiber blanket or a mica material. The heat-resisting material 13 is a carbon material such as a carbon sheet which withstands contact with the high-temperature molten material. The reservoir container 10 is laid between the casing body 2 and the casing pallet 5 which supports the casing body. The reservoir container 10 has a side wall 14 standing with a gap between an outer wall surface of the casing body 2 and an inner wall surface of the reservoir container 10, and the reservoir space 100 is formed outside the casing body 2.

The side wall 14 is set to have a height of approximately 5 to 10 cm, and the reservoir space is set to have a volume that can retain the high-temperature molten material having flowed out of a lower part of the casing body 2. Since the reservoir space 100 is in constant contact with the ambient air, the high-temperature molten material retained therein rapidly solidifies without leaking out of the reservoir space 100. When the reservoir space 100 for the high-temperature molten material is formed along a perimeter of a bottom of the casing 1 in this way, the high-temperature molten material that has flowed out of the lower part of the casing body 2 does not reach the adjacent casing 1, and a fire can be confined within a single module battery. Therefore, the extent of accidental damage is limited.

Figure 3:
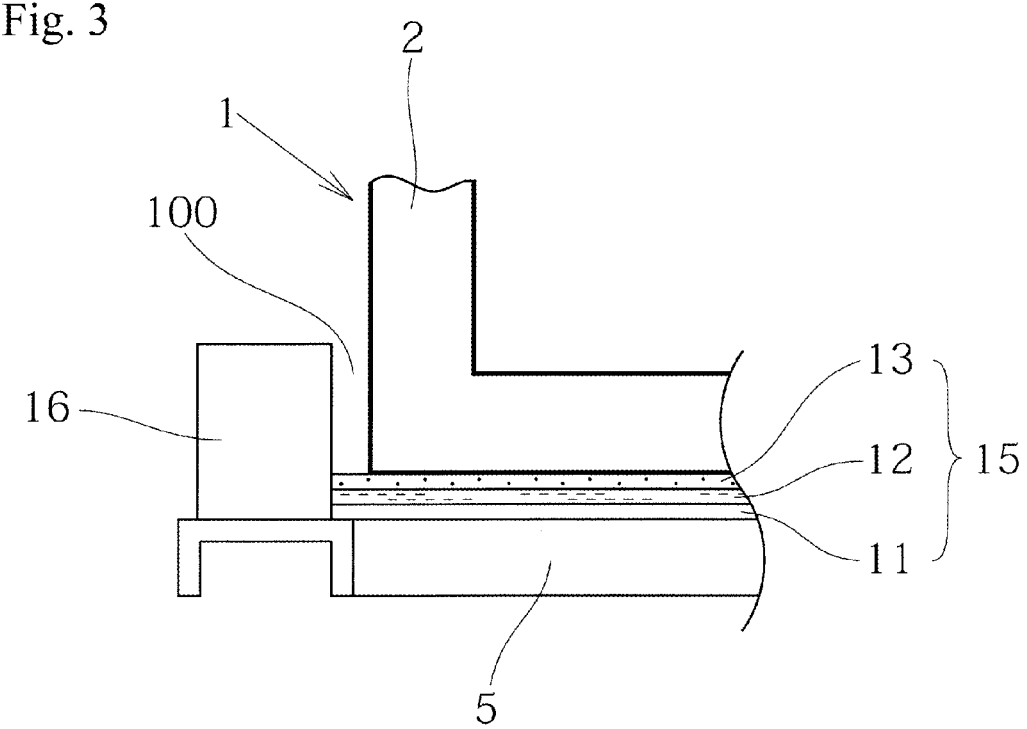
FIG. 3 is a cross-sectional view showing an embodiment according to the third aspect of the invention.

FIG. 3 is a cross-sectional view showing an embodiment according to the third aspect of the invention. In the embodiment shown in FIG. 2, the reservoir container 10 has the side wall 14 standing with the gap between the side wall 14 and the outer wall surface of the casing body 2, and the reservoir space 100 is formed outside the casing 1. On the other hand, in the embodiment shown in FIG. 3, the composite member 15 of the rigid member 11, the heat-insulating material 12, and the heat-resisting material 13 is laid between the casing body 2 and the casing pallet 5 which supports the casing 1 while a steel member 16 stands with a gap between the steel member and the outer wall surface of the casing body 2, and the reservoir space 100 is formed. This reservoir space 100 serves a similar function to that of the reservoir space 100 shown in FIG. 2.

Figure 4:
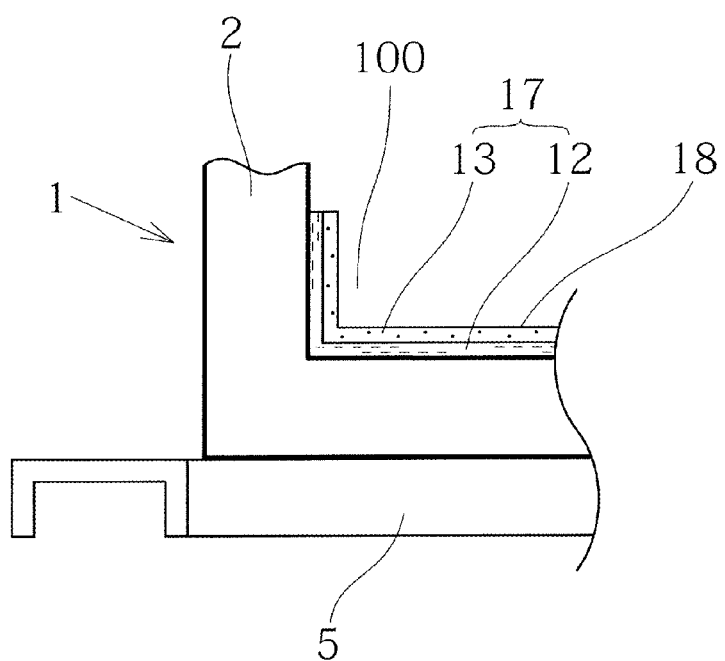
FIG. 4 is a cross-sectional view showing an embodiment according to the fourth aspect of the invention.

FIG. 4 is a cross-sectional view showing an embodiment according to the fourth aspect of the invention. According to this embodiment, a reservoir container 18 including a composite member 17 of the heat-insulating material 12 and the heat-resisting material 13 is disposed in a space containing the cells 4 inside the casing 1, and the reservoir space 100 is formed inside the casing body 2. With such a structure, at the time of accident, the high-temperature molten material is retained within the reservoir space 100 inside the casing body 2. Therefore, the high-temperature molten material does not melt a bottom of the casing body 2 to flow downward out of the casing body 2. In contrast to the above-described embodiments, the composite member 17 of the heat-insulating material 12 and the heat-resisting material 13 is used because an inner wall of the casing body 2 fulfils a function as the rigid member 11.

Figure 5:
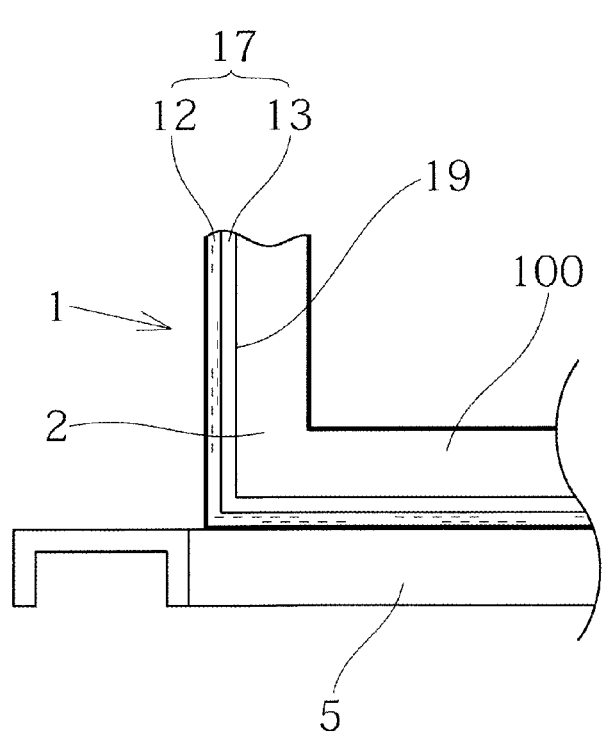
FIG. 5 is a cross-sectional view showing an embodiment according to the fifth aspect of the invention.

FIG. 5 is a cross-sectional view showing an embodiment according to the fifth aspect of the invention. According to the embodiment shown in FIG. 4, the reservoir space 100 is formed in the space containing the cells 4 inside the casing 1. On the other hand, according to the embodiment shown in FIG. 5, the reservoir space 100 is formed within the heat-insulating layer included in the casing body 2. That is, a reservoir container 19 including the composite member 17 of the heat-insulating material 12 and the heat-resisting material 13 is arranged on an inner surface of the outer covering of the casing body 2, and the reservoir space 100 is formed within the heat-insulating layer. Again with the structure of this embodiment, the high-temperature molten material is retained within the reservoir space 100 inside the casing 1. Therefore, the high-temperature molten material does not melt the bottom of the casing body 2 to flow downward out of the casing 1.

Figure 6:
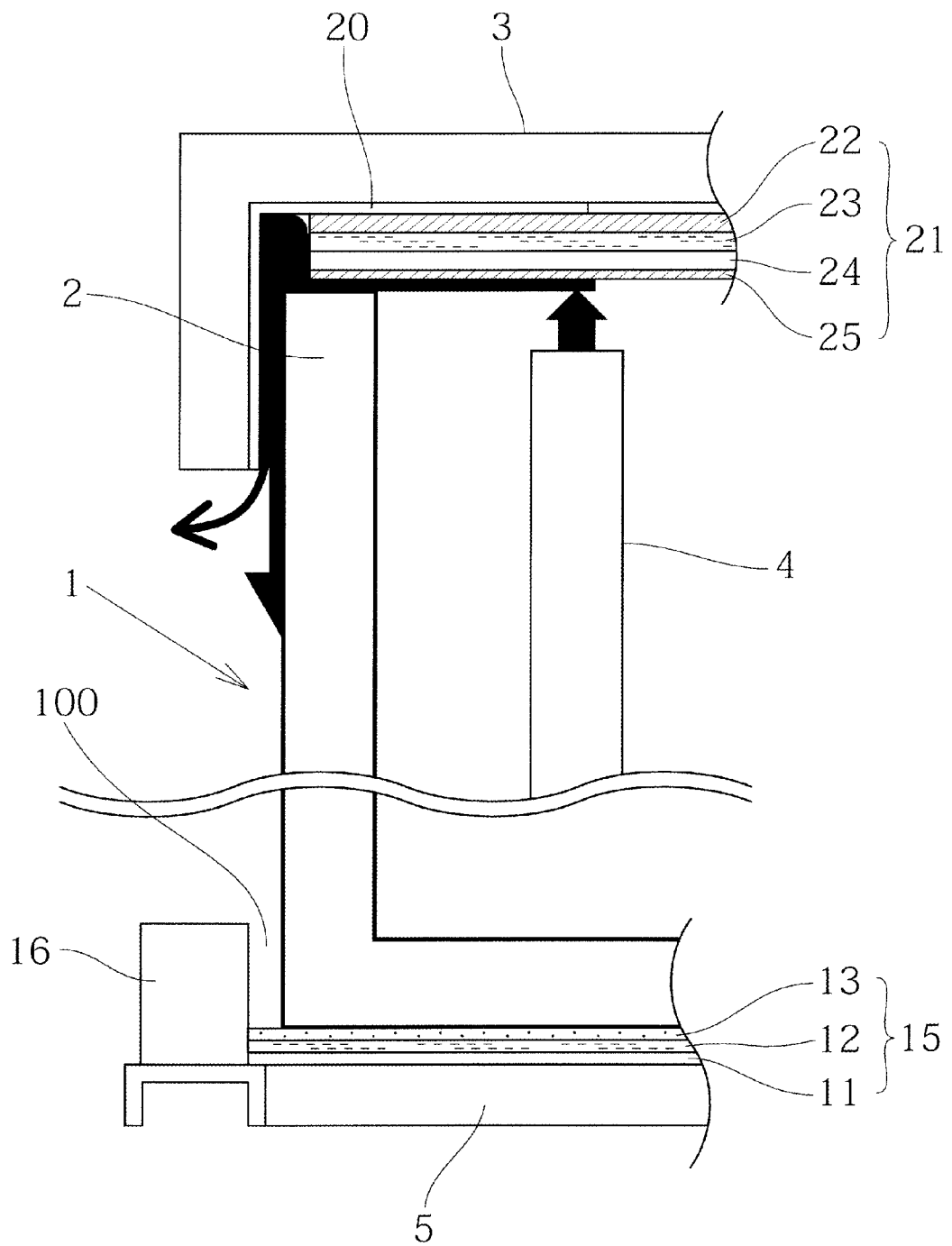
FIG. 6 is a cross-sectional view showing an embodiment according to the sixth aspect of the invention.

FIG. 6 is a cross-sectional view showing an embodiment according to the seventh aspect of the invention. According to this embodiment, in order to prevent an accident in which the high-temperature molten material melts the top lid 3 by heat thereof and penetrates the top lid 3 of the casing 1 to spout together with a combustion flame, a heat-resisting guide 20 is disposed in a gap between the casing body 2 and the top lid 3 on an inner surface of the top lid of the casing 1. The heat-resisting guide 20 includes a heat-insulating material and a fire-resisting material. Specifically, the heat-resisting guide includes a mica plate and a carbon material. While the heat-resisting guide 20 is arranged only in a corner in FIG. 6, the heat-resisting guide may be formed on an entire back surface of the lid 3. Note that a fire-spread-prevention plate 21 covers the back surface of the lid 3 and is a laminate of a mica plate 22, a heat-insulating material 23, a fire-resisting material 24, and a mica plate 25. The mica plates 22, 25 are resistant to heat at about 1400° C.

With such a structure, the high-temperature molten material that has spouted upward out of the cell 4 is blocked by the fire-spread-prevention plate 21, and flows downward along an inner surface of the heat-resisting guide 20 as indicated by arrows, to be introduced to the reservoir space 100 formed along the perimeter of the casing 1. Accordingly, an accident in which the high-temperature molten material penetrates the top lid 3 to spout together with a combustion flame can be prevented.

As heretofore described, according to the present invention, even when an accident occurs to generate a high-temperature molten material inside the casing 1, the high-temperature molten material does not leak out of the casing 1, and therefore the safety is attained.

REFERENCE SIGN LIST

1 casing
2 casing body
3 top lid
4 cell
5 casing pallet
10 reservoir container
11 rigid member
12 heat-insulating material
13 heat-resisting material
14 side wall
15 composite member
16 steel member
17 composite member
18 reservoir container
19 reservoir container
20 heat-resisting guide
21 fire-spread-prevention plate
22 mica plate
23 heat-insulating material
24 fire-resisting material
25 mica plate
100 reservoir space

The invention claimed is:

1. A sodium-sulfur battery having a plurality of cells contained in a casing that is a module container,
   wherein a reservoir space is formed outside the module container to retain and solidify a high-temperature molten material of over 2,000 degrees Celsius having flowed out of the cells in order to prevent a fire from spreading to an adjacent module when the fire occurs.

2. The sodium-sulfur battery according to claim 1,
   wherein the reservoir space is formed by a reservoir container including laminated material consisting of a steel plate, a heat-insulating material, and a heat-resisting material,
   the reservoir container is laid between the casing and a fulcrum of the casing, and
   the reservoir container has a side wall standing with a gap between the side wall and an outer wall surface of the casing.

3. The sodium-sulfur battery according to claim 1,
   wherein the reservoir space is formed by laminated material consisting of a steel plate, a heat-resisting material that is laid between the casing and a fulcrum of the casing, and a steel member standing with a gap between the steel member and the outer wall surface of the casing.

4. The sodium-sulfur battery according to claim 2,
   wherein the heat-insulating material comprises a ceramic fiber blanket or a mica material, and
   the heat-resisting material comprises a carbon material.

5. The sodium-sulfur battery according to claim 1,
   wherein a heat-resisting guide is disposed in a gap between a casing body and the top lid on an inner surface of the top lid of the casing.

6. The sodium-sulfur battery according to claim 5,
   wherein the heat-resisting guide comprises laminated material consisting of a heat-insulating material and a fire-resisting material.

7. The sodium-sulfur battery according to claim 5,
   wherein the heat-resisting guide comprises a mica plate and a carbon material.

8. The sodium-sulfur battery according to claim 3,
   wherein the heat-insulating material comprises a ceramic fiber blanket or a mica material, and
   the heat-resisting material comprises a carbon material.

* * * * *